Figure 1:
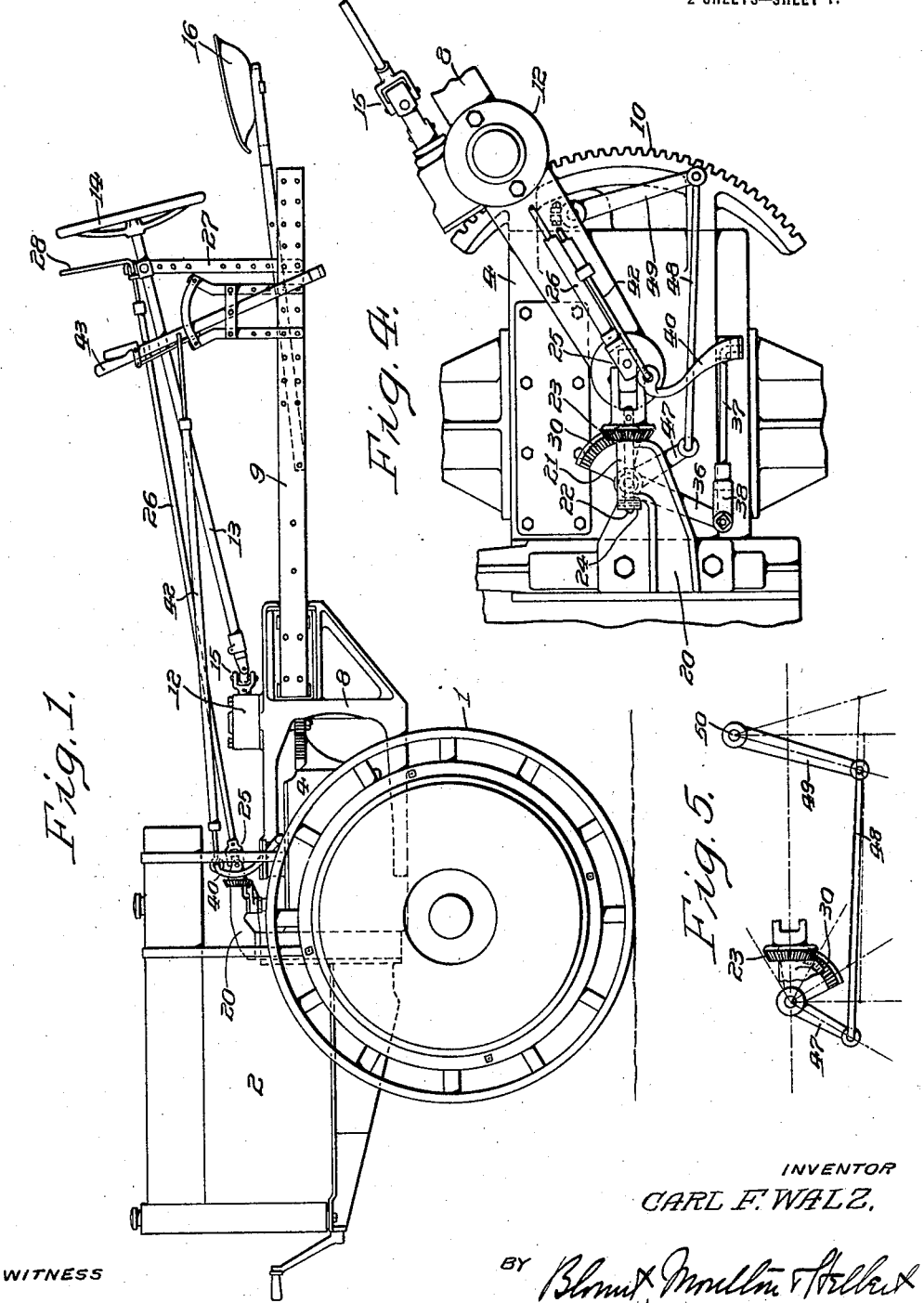

C. F. WALZ.
TRACTOR.
APPLICATION FILED JULY 26, 1920.

1,388,009.

Patented Aug. 16, 1921.
2 SHEETS—SHEET 2.

INVENTOR
CARL F. WALZ.

WITNESS
F. J. Hartman.

BY
*(attorneys' signatures)*
ATTORNEYS

UNITED STATES PATENT OFFICE.

CARL F. WALZ, OF MINNEAPOLIS, MINNESOTA, ASSIGNOR TO S. L. ALLEN & CO., INC., A CORPORATION OF PENNSYLVANIA.

TRACTOR.

1,388,009.  Specification of Letters Patent.  Patented Aug. 16, 1921.

Application filed July 26, 1920. Serial No. 398,988.

*To all whom it may concern:*

Be it known that I, CARL F. WALZ, a citizen of United States, and a resident of Minneapolis, county of Hennepin, and State of Minnesota, have invented certain new and useful Improvements in Tractors, of which the following is a specification, reference being had to the accompanying drawings.

My invention relates more particularly to tractors intended for use in agricultural operations and the like and which comprise a power unit including suitable transmission mechanism ordinarily of the "sliding gear" type, supported on a pair of traction wheels and a rearwardly extending beam pivoted for horizontal movement with respect to the power unit, the beam under operative conditions, being attached to and supported by, a trailing implement or the like. In operation the tractor is steered and the power unit controlled through suitable means carried by the beam and movable therewith, and as the steering is effected by causing relative horizontal movement between the wheels and the lower unit of the tractor on one hand and the beam on the other, it is requisite to provide means for permitting this movement to occur without affecting the adjusted position of the power unit controls, and more particularly the gear shifting means, as well as for permitting the operation of the controls from any position which may be assumed by the beam.

A principal object of my invention is the provision in a tractor having a rearwardly extending beam or similar member horizontally movable with respect to the power unit of the tractor and serving to support the power unit controls, of means whereby such movement of the beam as may be requisite in the operation of the tractor will not affect or disturb the adjusted position of the transmission gears of the power unit and to provide in a tractor of the character aforesaid, means for shifting the transmission gears without reference to and independently of the position of the tractor beam with respect to the power unit of the tractor.

Further objects of my invention are to provide means adapted for the performance of the hereinbefore mentioned functions which are of simple design and construction and not liable to get out of order or to be damaged through rough handling or long continued use; which are reliable and positive in operation, and which may be readily embodied in tractors of the ordinary type without extensive changes and alterations in their design.

My invention further includes all of the other various objects and novel features of construction and arrangement hereinafter more definitely specified and described.

While for the purpose of carrying out the objects of my invention I may employ any suitable instrumentalities or combinations thereof effective for performing the desired functions I have, for the purpose of enabling those skilled in the art to practice the invention, illustrated in the accompanying drawings, and will now proceed to describe, a preferred embodiment of means suitable therefor in combination with a tractor of typical design and construction, only showing however, such parts of the latter as are requisite for obtaining a clear comprehension of the invention. It will be understood, therefore, that it is not my desire or intention to limit myself by the present disclosure to the employment of my invention in a tractor of the specific form and construction which I have shown, as the invention is equally adapted for employment in tractors of other design.

Figure 2:
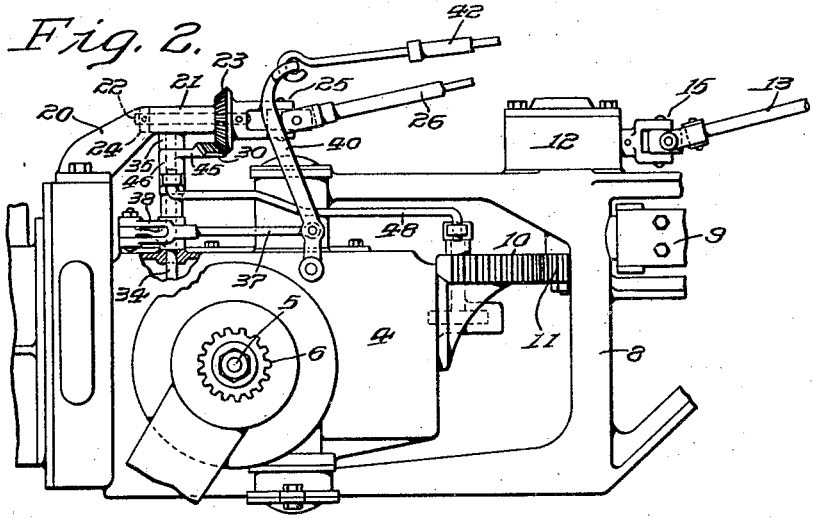
Figure 3:
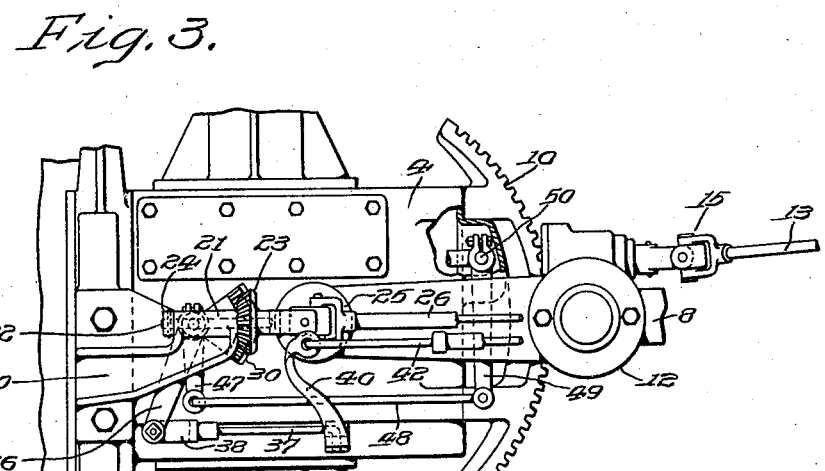

In the drawings, Figure 1 is a side elevation of a farm tractor embodying a preferred form of my invention; Fig. 2, an enlarged fragmentary side elevation of the transmission housing and adjacent parts of the tractor shown in Fig. 1; Fig. 3, a top plan view of the same, the various parts in these two figures being in the same position; Fig. 4, a top plan view similar to Fig. 3 but showing certain of the parts in a different position, and Fig. 5, a substantially diagrammatic top plan view of certain of the parts shown in Figs. 3 and 4 but in another position. Like numerals are employed to designate corresponding parts in the several figures.

The tractor shown in the drawing embodies a pair of traction wheels 1 rotatable on suitable axles and which serve to support the power unit, comprising an internal combustion motor positioned beneath a hood 2 and a transmission housing 4 in the rear of the motor and preferably operatively unitary therewith, within which is positioned suitable transmission mechanism of any preferred design and construction through which the power generated by the motor is transferred to the traction wheels, ordinarily through the medium of a jack-shaft 5 carrying on each end a pinion 6 meshing with an internal ring gear (not shown) carried by each wheel. The particular design and construction of the transmission mechanism form no part of the present invention, but it will be understood that ordinarily in tractors of this type the mechanism is arranged to give one or more speeds forward and a single reverse speed as well as a neutral point or position to which the shifting gear or gears may be brought when desired. It will further be understood that interposed between the transmission mechanism and the motor is a clutch of any suitable design and that means are provided, one form of which is hereinafter more particularly described, for effecting its engagement and disengagement.

Pivoted to any suitable part of the power unit, for example and as shown, to the transmission housing, is a rearwardly extending yoke 8 which carries a rearwardly extending beam 9 of suitable design supported on the yoke in any suitable manner, the beam and yoke being capable of movement in a horizontal plane with respect to the power unit, such movement being conveniently effected through the coaction of a segmental rack 10 carried by the transmission housing and a pinion 11 meshing therewith carried on the yoke, and rotatable through the medium of suitable gearing, contained in a housing 12, by the steering post 13 terminating in a steering wheel 14, a universal joint 15 between the gearing and the post compensating for the angularity of the steering post. It will be understood that in use the tractor is steered by causing relative movement between the power unit and the beam to which the trailing implement is attached, as will be well understood by those familiar with the art, so that the relative angular relation of the beam and power unit is frequently changed.

It will be further understood that in the operation of the tractor the gears within the transmission housing, must be frequently shifted and that as the operator is usually seated adjacent the steering wheel, either on a seat 16 carried by the tractor beam or on a seat carried by the implement, it is desirable that the gear shifting means or lever be positioned at a point adjacent the outer end of the beam where it may be conveniently reached by the operator. Means must therefore be provided for connecting the gear shifting lever with the shifting mechanism inside of the transmission case, and since, as hitherto stated, the angular relation between the beam and the transmission case is frequently varied and, in consequence, the relative position of the gear shifting lever supported by the beam and the shifting mechanism within the case, the movement of the beam would tend to effect an undesired movement of the gears in the absence of the provision of means for the prevention thereof.

For the purpose of obviating this difficulty I provide by the employment of suitable instrumentalities, a preferred form of which will be hereinafter described, means whereby the gears may be shifted by suitable actuation of the gear shifting lever carried by the beam without regard to the relative angular relation of the beam and the transmission housing, said means also permitting desired movement of the beam necessary in the operation of the tractor without causing any disturbance of the position to which the gears may have been adjusted or shifted. In the preferred embodiment of my invention, said means may comprise a bracket 20 positioned above the transmission housing and providing a horizontally disposed sleeve 21 through which extends a shaft 22 carrying at one end a bevel gear 23 rotatable with the shaft, a collar 24 pinned on the opposite end of the shaft serving to hold it in position within the sleeve. The gear 23 may conveniently be made integral with one member of a universal joint 25 positioned behind the gear and from which a rod 26 extends rearwardly to a support 27 carried by the tractor beam, a handle 28, which may be conveniently termed the gear shifting lever, being formed on the end of the rod and positioned within easy reach of the operator. In order to afford the utmost freedom of movement to the beam in the operation of steering the tractor, it is desirable to position the universal joint 25 as nearly as may be to the vertical axis of oscillation of the beam, so that as the latter carrying the rod 26 swings horizontally, any possible tendency to cause rotation of the shaft 22 is reduced to a minimum.

Suitably positioned to mesh therewith and preferably beneath the gear 23 is a segmental bevel rack or gear 30 which is arranged for horizontal rotation in either direction by the said gear, suitable means being provided for its support. While said means may be of any suitable form or construction, I prefer to use the clutch actuating shaft 34 as a support for the gear 30 by extending the shaft upwardly to engage within a boss 35 formed on the bracket 20, thereby steadying the shaft without impairing its freedom of rotation. It will be understood that for the purpose of causing the partial revolution of this shaft to actuate the clutch, suitable means are provided, which may conveniently comprise a lever 36 pinned or otherwise secured to the shaft and extending horizontally outwardly therefrom, one end of the lever being connected to a rod 37 through a suitable clevis 38 and the other end to a substantially vertically extending lever 40, the lower end of which is pivoted to the transmission housing and the upper end preferably bent inwardly and engaged through a hook and eye or other suitable connection, with a rod 42 extending rearwardly to the clutch lever 43 supported on and carried by the tractor beam. It will be understood, however, that the construction and arrangement of the means employed for actuating the clutch form no part of the present invention and may therefore be of any suitable form or design, but it may be observed that as considerable lost motion can be permitted in the linkage employed between the clutch lever and the clutch shaft 34 without impairing the operator's control of the clutch, the linkage may be readily arranged in numerous ways which are entirely satisfactory in operation and substantially unaffected by relative movement between the tractor beam and the transmission housing.

When, therefore, the clutch shaft 34 is utilized to afford support for the gear 30, the latter may be provided with an arm or web 45 integral with a sleeve 46 surrounding and rotatable upon the shaft 34, the sleeve being also provided with another arm 47, either integral therewith or suitably secured thereto, and which may extend approximately at right angles to the center line of the gear. The outer extremity of arm 47 is conveniently connected, as by a rod 48, to another arm 49 carried by the gear shifting shaft 50 which passes through the transmission housing and serves to actuate the forks or other mechanism therein disposed through the medium of which the gears within the housing are moved in and out of mesh. It will be understood that the mechanism within the housing may be of any suitable design and construction, as will be readily understood by those familiar with the art, and as the same forms no part of my invention I have omitted illustration and description thereof, it being sufficient for a clear comprehension of the present invention to understand that the actuation of the gear shifting means is effected by partial rotation of the shaft 50 or other equivalent means extending outside of the transmission housing and adapted for attachment of the arm 49 or its equivalent.

Assuming the parts to have been constructed and assembled substantially as hereinbefore described, I have shown in Figs. 2 and 3 the relation assumed by the several elements when the tractor beam is substantially in central position with respect to the rack 10 and the transmission gears in neutral position, the segment 30 being preferably approximately centrally disposed with respect to the center line of the machine. It will be evident that under these conditions movement of the handle 28 to the right or left will serve to rotate gear 23 and swing the segment 30 in the opposite direction, thus throwing the arm 47 either to the position shown in Fig. 4, or to the position shown in Fig. 5, and effecting a corresponding movement of the arm 49, which serves to rotate the gear shifting shaft 50 and move the gears within the transmission housing into mesh to give either a forward or reverse speed as may be desired, depending upon the direction of movement of the handle 28. Moreover, the actuation of the segment 30 to shift the gears to desired position, or to bring them into neutral position, may be accomplished by suitable manipulation of the handle 28 whatever be the position of the beam with respect to the transmission housing, or even when the former is brought to the extremity of its movement in one direction as shown in Fig. 4, the handle 28 may be manipulated and the segment moved as readily as when the beam is in central position, the universal joint 25 serving to compensate for any angularity between the rod 26 and the shaft 22 arising from the movement of the beam relative to the transmission housing. Furthermore, since the universal joint 25 is preferably positioned as near as possible over the pivotal center of the beam, the motion of the latter which might otherwise tend to cause some slight movement of the gear 23 and corresponding movement of the transmission gears is taken care of in the joint, and any tendency to cause binding or constriction of the parts or movement of gear 23 is avoided.

It will be understood that while I have herein described and illustrated a preferred form of my invention embodied in a tractor of well known design I do not thereby desire or intend to limit myself solely thereto or to the employment of the invention in any particular type of tractor, as the particular details of construction and arrangement of the various parts may be modified, and means other than an extension of the clutch shaft employed for rotatably supporting the segmental gear and other desired modifications effected in the general arrangement or form of the various parts to adapt the invention to particular conditions encountered in practice and to facilitate its employment with and embodiment in tractors of different types, without departing from the spirit and scope of the invention as defined in the appended claims.

Having thus described my invention, I claim and desire to protect by Letters Patent of the United States:

1. The combination in a tractor having a power unit comprising transmission gearing and a beam relatively movable with respect to said unit, of means for shifting said gearing comprising shifting means movable with said beam, intermeshing gears supported adjacent said power unit, means connecting one of said gears with said transmission gearing and means connecting the other of said gears with said shifting means.

2. The combination in a tractor having a power unit comprising transmission gearing and a beam relatively movable with respect to said unit, of means for shifting said gearing comprising shifting means supported on said beam and movable therewith, bevel gearing supported adjacent said power unit, means connecting one of said bevel gears with said transmission gearing and flexible means connecting said shifting means with the other of said gears.

3. The combination in a tractor having a power unit comprising transmission gearing and a beam relatively movable with respect to said power unit, of means for shifting the gears in said transmission gearing comprising a shifting lever supported on said beam and movable therewith, a shifting arm supported adjacent said gearing and connected therewith, a gear rotatable by said shifting lever, a segment in engagement with and rotatable by said gear and means connecting said segment with said arm.

4. The combination with a tractor having a power unit comprising a transmission gearing and a beam relatively movable with respect thereto, of gear shifting means carried by said beam and means interposed between said shifting means and said transmission gearing whereby said gearing may be shifted independently of the position of said beam, said interposed means comprising a bevel gear, a segment meshing with said gear, said gear and said segment being supported on said power unit, means connecting said segment with said transmission gearing and means connecting said shifting means with said bevel gear whereby said gear may be rotated by actuation of said shifting means.

5. The combination in a tractor having a power unit comprising transmission gearing and a beam horizontally movable with respect to said unit, of gear shifting means carried by said beam, and means interposed between said shifting means and said transmission gearing whereby said shifting means may be operated independently of the position of the beam with respect to said power unit, said interposed means comprising a gear, flexible means connecting said gear and shifting means, a segment meshing with said gear, said gear and said segment being supported adjacent said power unit, and means connecting said segment with said transmission gearing.

6. The combination in a tractor having a power unit comprising transmission gearing, a housing for said gearing and a beam pivoted to said housing for horizontal movement with respect thereto, of gear shifting means supported on said beam and means interposed between shifting means and said transmission gearing whereby said shifting means may be operated to shift said gearing independently of the position of said beam with respect to said housing, said interposed means comprising a gear, a universal joint connected to said gear, means connecting said joint with said shifting means, a segment in engagement with said gear and rotatable thereby and means connecting said segment with said transmission gearing.

7. The combination in a tractor having a power unit comprising transmission gearing, a housing for said gearing and a beam pivoted to said housing for horizontal movement with respect thereto, of gear shifting means supported on said beam and means interposed between shifting means and said transmission gearing whereby said shifting means may be operated to shift said gearing independently of the position of said beam with respect to said housing, said interposed means comprising a gear, a universal joint positioned substantially in line with the pivotal axis of said beam and connected to said gear, means connnecting said joint with said shifting means, a gear in engagement with said gear and rotatable thereby and means connecting said last mentioned gear with said transmission gearing.

8. In a tractor having a sliding gear transmission, means for shifting the gears in said transmission comprising a pair of intermeshing gears supported adjacent to said transmission, means connecting one of said gears with the sliding gear of the transmission, a shifting lever and means connecting the other of said gears with said lever.

9. In a tractor having a sliding gear transmission, means for shifting the gears in said transmission, said means comprising a pair of intermeshing gears supported adjacent said transmission, means connecting one of said gears with the sliding member of the transmission, a shifting lever, and means comprising a universal joint connecting the other of said gears and said shifting lever.

10. The combination in a tractor having a sliding gear transmission, a housing therefor and a member relatively movable with respect to said housing, of a gear shifting member carried thereby and movable therewith, means interposed between said shifting member and said transmission gearing comprising intermeshing gearing supported adjacent said housing, means connecting one member of said gearing with said transmission gearing and means connecting the other member of said gearing with said shifting member.

In witness whereof, I have hereunto set my hand this 20th day of July, A. D. 1920.

CARL F. WALZ.